(12) United States Patent
Althaus et al.

(10) Patent No.: US 12,717,466 B2
(45) Date of Patent: Aug. 25, 2026

(54) METHOD OF OPERATING AND CONFIGURING A PUMP WITH A FUNCTION MODULE

(71) Applicants: Dirk Althaus, Dortmund (DE); Daniel Bencak, Dortmund (DE); Nils Eckardt, Dortmund (DE)

(72) Inventors: Dirk Althaus, Dortmund (DE); Daniel Bencak, Dortmund (DE); Nils Eckardt, Dortmund (DE)

(73) Assignee: WILO SE, Dortmund (DE)

( * ) Notice: Subject to any disclaimer, the term of this patent is extended or adjusted under 35 U.S.C. 154(b) by 0 days.

(21) Appl. No.: 17/557,178

(22) Filed: Dec. 21, 2021

(65) Prior Publication Data

US 2022/0197489 A1 Jun. 23, 2022

(30) Foreign Application Priority Data

Dec. 23, 2020 (LU) ........................................ 102365

(51) Int. Cl.
*G06F 3/0484* (2022.01)
*F04D 15/00* (2006.01)
*G06F 3/0482* (2013.01)
*G06F 3/04847* (2022.01)
*H04L 67/12* (2022.01)

(52) U.S. Cl.
CPC ......... *G06F 3/04847* (2013.01); *F04D 15/00* (2013.01); *G06F 3/0482* (2013.01)

(58) Field of Classification Search
None
See application file for complete search history.

(56) References Cited

U.S. PATENT DOCUMENTS 10,993,097 B1 * 4/2021 Stamatakis ............. H04L 67/12
2006/0005127 A1 * 1/2006 Ferguson ............... G06F 16/25 715/248
2011/0135515 A1 6/2011 Jensen
2012/0174002 A1 * 7/2012 Martin .................... G06F 9/451 715/763
2013/0317753 A1 * 11/2013 Kamen .................. H04L 45/02 600/595

(Continued)

FOREIGN PATENT DOCUMENTS

DE 102007046662 A1 4/2009

*Primary Examiner* — Irete F Ehichioya
*Assistant Examiner* — Samuel Shen
(74) *Attorney, Agent, or Firm* — Lucas & Mercanti, LLP

(57) ABSTRACT

An electronic functional module for control electronics of a centrifugal pump assembly has a functional unit that adds an additional function to the control electronics, and the control electronics has operating software with a graphical user interface for settings of the centrifugal pump assembly whose appearance is defined by image frame data. The functional module transmits values of attributes that describe properties of at least one variable of the functional unit to the control electronics, and the control electronics generates, as a function of the attribute values using the image frame data and according to a set of rules, screen views that are independent of the operating software and that supplement the user interface at least temporarily. These screen views, including a value of the variable integrated into one of the screen views, are shown on a display.

25 Claims, 7 Drawing Sheets

(56) References Cited

U.S. PATENT DOCUMENTS

| | | | | |
|---|---|---|---|---|
| 2014/0336576 | A1* | 11/2014 | Gamelin | G01R 31/52 604/500 |
| 2018/0011678 | A1* | 1/2018 | Shipper | G06F 3/0482 |
| 2018/0291911 | A1* | 10/2018 | Ward | F04F 5/10 |
| 2018/0335038 | A1* | 11/2018 | Vestergaard Kragelund | F04D 15/00 |
| 2020/0293164 | A1* | 9/2020 | Lee | G06F 40/14 |
| 2020/0295994 | A1* | 9/2020 | Shurtleff | H04L 43/0811 |
| 2021/0123771 | A1* | 4/2021 | Vega | G01D 4/004 |

* cited by examiner

P
15
Functional Unit
1
11
Con-troller
Inter-face
12 13 14 10 16
25
Display
2
20
21
Con-troller
Input Device
27
22
23
24
26

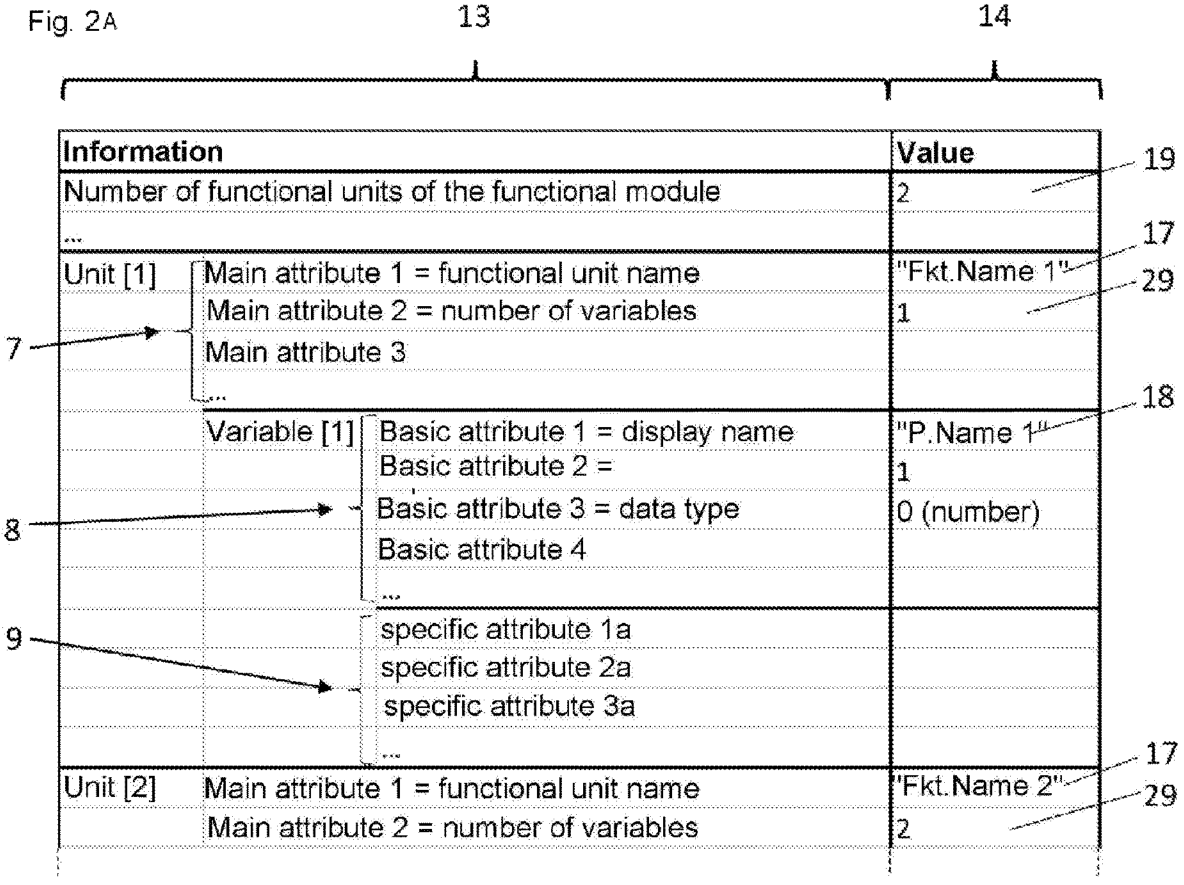
Fig. 2A
13
14
Information
Value
Number of functional units of the functional module
2
19
...
Unit [1]
Main attribute 1 = functional unit name
"Fkt.Name 1"
17
Main attribute 2 = number of variables
1
29
7
Main attribute 3
...
Variable [1]
Basic attribute 1 = display name
"P.Name 1"
18
Basic attribute 2 =
1
8
Basic attribute 3 = data type
0 (number)
Basic attribute 4
...
specific attribute 1a
9
specific attribute 2a
specific attribute 3a
...
Unit [2]
Main attribute 1 = functional unit name
'Fkt.Name 2"
17
Main attribute 2 = number of variables
2
29

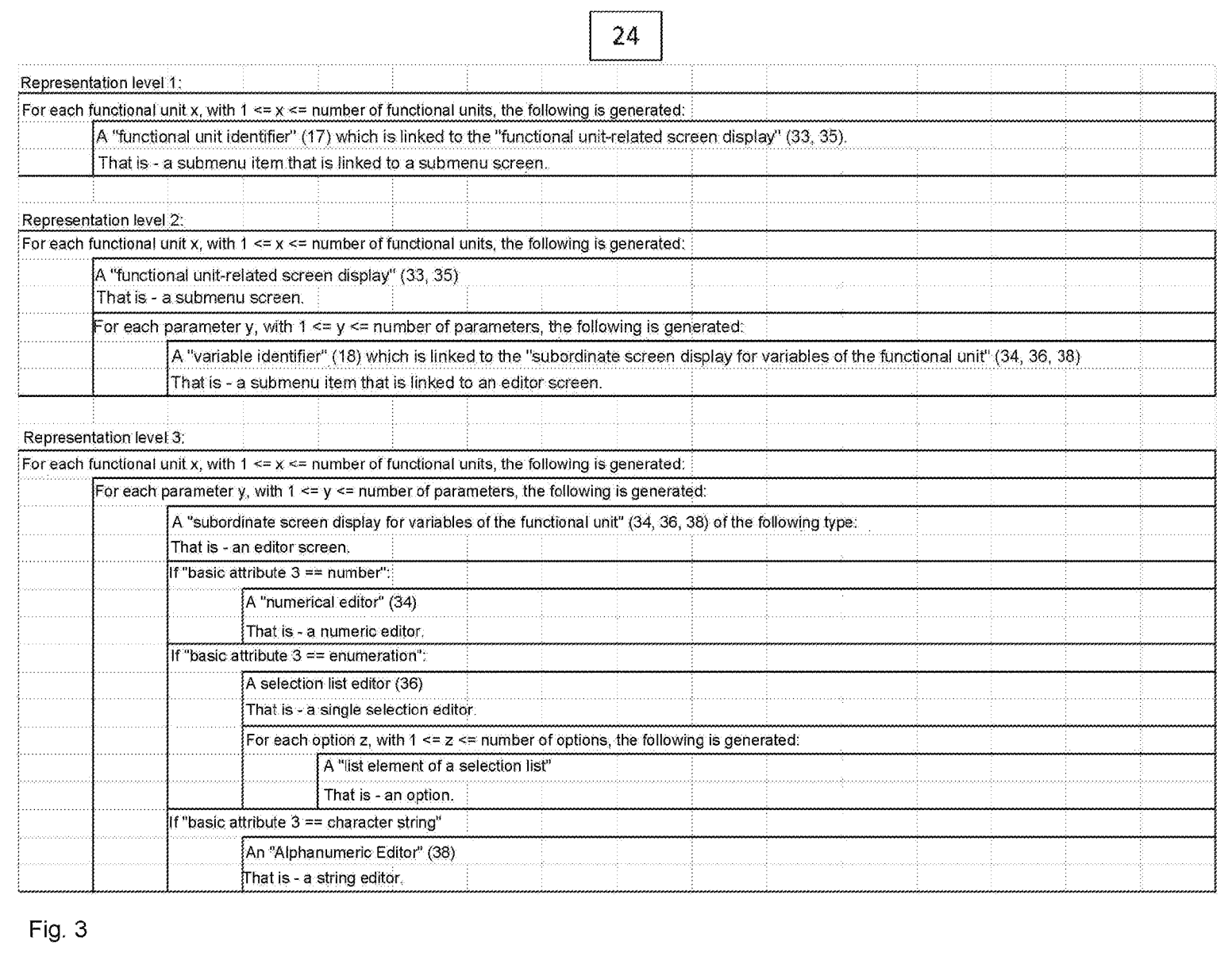

24

Representation level 1:

- For each functional unit x, with 1 <= x <= number of functional units, the following is generated:
  - A "functional unit identifier" (17) which is linked to the "functional unit-related screen display" (33, 35).
    That is - a submenu item that is linked to a submenu screen.

Representation level 2:

- For each functional unit x, with 1 <= x <= number of functional units, the following is generated:
  - A "functional unit-related screen display" (33, 35)
    That is - a submenu screen.
  - For each parameter y, with 1 <= y <= number of parameters, the following is generated:
    - A "variable identifier" (18) which is linked to the "subordinate screen display for variables of the functional unit" (34, 36, 38)
      That is - a submenu item that is linked to an editor screen.

Representation level 3:

- For each functional unit x, with 1 <= x <= number of functional units, the following is generated:
  - For each parameter y, with 1 <= y <= number of parameters, the following is generated:
    - A "subordinate screen display for variables of the functional unit" (34, 36, 38) of the following type:
      That is - an editor screen.
    - If "basic attribute 3 == number":
      - A "numerical editor" (34)
        That is - a numeric editor.
    - If "basic attribute 3 == enumeration":
      - A selection list editor (36)
        That is - a single selection editor.
      - For each option z, with 1 <= z <= number of options, the following is generated:
        - A "list element of a selection list"
          That is - an option.
    - If "basic attribute 3 == character string"
      - An "Alphanumeric Editor" (38)
        That is - a string editor.

Fig. 3

METHOD OF OPERATING AND CONFIGURING A PUMP WITH A FUNCTION MODULE

FIELD OF THE INVENTION

The invention relates to a method of operating, in particular for configuring, an electronic functional module that is connected to control electronics of a centrifugal pump assembly, in order to add at least one additional function to the control electronics. The invention also relates to a functional module and to control electronics for carrying out the method.

BACKGROUND OF THE INVENTION

Functional modules for expanding the functional scope of a centrifugal pump assembly are known. For example, under item number 2097810, WILO SE offers a functional module, also known as an IF module (IF=Interface), for its centrifugal pump assemblies of the Stratos series and the dry-running type, which adds a serial communication interface for BACnet to the control electronics of the pump, to enabling connecting a centrifugal pump to a building automation system. The IF module provides both the electrical connection (RS485) for connecting the pump to a BACnet and the necessary communication protocol. WILO SE offers a functional module of this type under item number 2097808, which enables expanding the functionality of the pump accordingly using the MODBUS industrial standard. As such, a user can optionally supplement the centrifugal pump assembly and adapt it specifically to his needs and the local communication infrastructure. The two functional modules are plugged into the same electrical interface on the centrifugal pump assembly.

To use the IF modules, certain variables or operating parameters must be configured, especially the specification of a unique address and the definition of the communication properties, such as the baud rate, the presence of a parity bit, and the number of stop bits. The variables are configured using the control electronics of the centrifugal pump assembly using generic setting parameters that are part of the operating software (firmware, pump software) of the centrifugal pump assembly, with the setting parameters being logically assigned to the variables of the given IF module or parts thereof. For this purpose, the setting parameters are displayed in a pump menu on a display for the setting procedure. In order to enable the different IF modules to be operated on the same electrical interface, a number of generic setting parameters, for example A, C, E, F, G, H are provided, with some of the setting parameters having different or even no meaning for different IF modules, such that not all setting parameters are required for a specific IF module. From the point of view of the IF modules, this means that the setting parameters of different IF modules are interpreted differently, and may not be interpreted either. The meaning or assignment of the individual setting parameters to a corresponding variable (mapping) and the appropriate setting of the setting parameters for the given IF module are explained in the installation and operating instructions for the relevant IF module. For example, a setting parameter A is interpreted by the above IF modules as the baud rate, and a value 5 of this setting parameter A is interpreted as the setting "9600 baud."

The setting parameters, including their value range, are an integral part of the pump software, especially the pump menu. The limited number of setting parameters cannot be expanded, nor can their value range that is restricted to numerical inputs. This results in the disadvantage that the development of new functional modules that require different or additional setting parameters, in particular setting parameters with a different value range, requires an adaptation of the operating software of the centrifugal pump assembly, or is incompatible with centrifugal pump assemblies that have outdated operating software. This is not a problem for new pumps, as they can be equipped with the new firmware directly. In the case of centrifugal pumps that have already been installed by the customer, that is, are "in the field" or are in the course of distribution, this is not possible due to the design—or, even if they have the option to update the operating software, it is disadvantageous from the user's point of view. It should also be taken into account that centrifugal pump assemblies have very long product life cycles, and are therefore in use for many years, while communication technologies, in particular their protocols, are newly developed or further developed in short cycles. Another disadvantage is that the configuration of the variables of a connected functional module based on the setting parameters is not self-explanatory, and the installation and operating instructions are required for each IF module for correct setting.

OBJECTS OF THE INVENTION

It is therefore an object of the present invention to provide an improved method of operating or configuring an electronic functional module of a centrifugal pump.

Another object is the provision of such an improved method of operating or configuring an electronic functional module of a centrifugal pump that overcomes the above-given disadvantages, in particular that creates a way of decoupling the development of the functional modules for centrifugal pump assemblies, on the one hand, from the development of the centrifugal pump assemblies themselves, in particular their software, and on the other hand, to ensure that functional modules developed in the future can also be used on the centrifugal pump assembly.

Another object of the invention is to simplify for the user access to a variable in the functional module, in particular the configuration of a functional module, which extends the functionality of a centrifugal pump assembly.

SUMMARY OF THE INVENTION

According to the invention, a method is proposed for operating, in particular for configuring, an electronic functional module for the control electronics of a centrifugal pump assembly to which it is connected, wherein the functional module has at least one functional unit that adds an additional function to the control electronics, and the control electronics has an operating software with a graphical user interface for settings on the centrifugal pump assembly, the appearance of which is defined by image frame data. For example, the graphical user interface is menu-based, that is, it is constructed in a hierarchical structure from menus and submenus. In principle, however, there is also the option of displaying all the settings that can be made in a single, holistic screen image.

In the method:

- the functional module sends values of attributes that describe the properties of at least one variable of the functional unit to the control electronics,
- the control electronics generates screen images as a function of the attribute values using the image frame data according to a set of rules that are independent of the operating software and that at least temporarily supplement the user interface, for example through submenus or additional icons in the holistic screen image, and the screen images, including a value of the variable integrated into one of the screen images, are shown on a display.

The present invention makes it possible to expand the functionality of a centrifugal pump assembly through connectable, in particular plug-in, functional modules of different types without the centrifugal pump assembly having to know the corresponding functional module a priori. Because the expansions in the graphical user interface of the operating software that are required for the configuration, or that are required simply to display the parameters of a specific functional module, and that are shown in corresponding screen images, are only generated when the functional module is connected to the control electronics, and are accordingly independent of the operating software of the control electronics to such an extent that they do not form an original part of it, both current and future functional modules can be supported by the centrifugal pump assembly and/or its control electronics. The invention consequently has the advantage that when the centrifugal pump assembly is being developed, it is not necessary for all functional modules or functional module types, nor the parameters thereof, to be known to the control electronics. This also makes it unnecessary to update the operating software of centrifugal pumps that have already been installed.

As already mentioned, according to an embodiment, the graphical user interface can be menu-based. In other words, settings in the operating software are possible with the aid of menus that are hierarchically structured in the graphical user interface in individual display levels, and that are displayed individually as a function of a corresponding selection. The screen images expanding the user interface can then form submenus that supplement this hierarchy and thus ensure a configuration of the functional module in an identical manner to the centrifugal pump setting, and in a graphically uniform design. In this case, the screen images can fill the entire display.

According to another embodiment, instead of a menu structure, a plurality of, in particular all, setting parameters can be displayed simultaneously in a single display level. This is particularly useful in the case of large displays, in particular in the case of touch displays, and enables the reproduction of a high density of information and direct access to a large number of parameters. The screen images that expand the graphical user interface can in this case be individual graphic elements such as icons, list entries, etc., which appear in the single display level, more precisely in an area of the display, after the functional module has been plugged in.

In addition, mixed forms of the two variants mentioned are also possible.

The functional module can be of any type. For example, the functional module can be a communication module, an interface module, a data module, a sensor module or an actuator module. Combinations of these functionalities are also possible.

In the case of a communication module, the functional unit of the functional module provides a bidirectional communication interface. This communication interface can be wired or wireless, for example radio-based. In the second case, the functional module can also be referred to as a radio module. In particular, the functional module can provide, for example, a wired interface for MODBUS, BACnet or Ethernet (TCP/IP, LAN, Internet), or a radio interface for Bluetooth (BLE), WiFi (WLAN), enocean, LoRa, NFC, Zigbee or the like.

In the case of a data module, that is, without external communication functionality, the functional unit of the functional module provides a memory functionality. For example, such a data module can be a data logger with a comparatively large data memory in order to store pump data, for example during field tests, it being possible to read them out later on a separate device. The data memory can be permanently integrated, or formed by an exchangeable medium. For example, the exchangeable medium can be an external memory such as an SD card or a USB stick that is inserted removably into a slot of the functional module. Alternatively, the data module can be a programming module that contains new operating software (firmware) for the control electronics.

In the case of a sensor module, the functional unit of the functional module supplements the control electronics or the centrifugal pump assembly with additional sensors. For this purpose, the functional unit can comprise at least one integrated sensor, for example a temperature, humidity, vibration or sound sensor.

In the case of an interface module, the functional unit of the functional module supplements the control electronics or the centrifugal pump assembly with an additional unidirectional interface for accepting an external measurement or control signal. Such an interface can be, for example, a 0-10 V input, a 4-20 mA input, a 1-wire input or a PWM input.

In the case of an actuator module, the functional unit of the functional module adds additional control functionality to the control electronics, allowing control of a device external to the control electronics such as a control valve, a further pump, a fan, a warning light, etc. For example, the functional unit can be a relay with a potential-free switching output for a collective fault message.

As noted above, combinations of the aforementioned functionalities are also possible. The functional module can thus contain two or more, in particular any number of functional units, each of which supplements the control electronics with its own additional function. For example, each functional unit can provide one of the aforementioned functionalities, possibly also across types. For example, a functional module can be a communication module with a first functional unit that provides a MODBUS interface and a second functional unit that provides a Bacnet interface. In another embodiment, the functional module can have a first functional unit in the form of a relay for a collective malfunction message (SSM) and a second functional unit that provides a 0-10 V input.

If a functional module comprises only a single functional unit, there is no need to logically distinguish between the functional module and the functional unit, since the functional module is the functional unit, and vice versa. However, since any number of different functional modules can exist, which can be optionally connected to the control electronics, and of which at least one functional module can contain two or more functional units, it is advantageous from a software point of view to ensure uniform treatment—in any case, to distinguish between functional module and functional unit, that is, even if the functional module comprises only a single functional unit and this distinction would not be necessary.

The functional unit of the functional module or each functional unit can have any number of variables. If two or more variables are present, one can also speak of a data record. The variable can be an operating parameter that is required for the operation of the functional module or its corresponding functional unit. For example, the operating parameter can be a password, a bus or network address, for example an IPv4, IPv6 address, or other communication properties, such as the transmission speed, for example baud rate, the presence of a stop bit, etc. In the case of a sensor module, the variable can be, for example, a measured variable. In the case of an actuator module, it can be a control variable. The variable can alternatively be a purely logical variable, the value of which optionally activates or deactivates a function—for example, in the case of a data module, logging of data or triggering the transmission of a software update to the control electronics. These examples show that the variable can be configurable, that is, that the access to the variable from the control electronics is read and write. However, such configurability does not necessarily have to be present, that is, access to the variable from the control electronics can also only be read, such as for a measured variable. Furthermore, these examples show that the variable type can be any type, for example binary, numeric, alphanumeric (text) etc.

According to the invention, a variable is formed by a set of attributes, each of which describes a property of the variable. Each attribute has a value that is sent from the functional module to the control electronics. Each functional unit preferably has its own attributes for at least one variable that the functional module sends to the control electronics.

Consequently, with the support of any number of functional modules, any number of functional units, and any number of variables, as well as the support of any variable types, the invention enables a high degree of flexibility. The system made up of the pump and functional module is given a design without technological restrictions.

According to the invention, after it has been connected to the control electronics, the functional module sends values of attributes that describe properties of the at least one variable of the functional unit to the control electronics. This can be done at the request of the control electronics or unsolicited, immediately after connecting. The attributes are assigned to the functional unit. They form part of a constitutional design of the functional module.

Furthermore, the control electronics generates the screen images according to the invention as a function of the attribute values of the variable or variables. The screen images represent a visualization of certain contents that are provided for display on a display in order to show them to the user. The contents are, for example, submenus, in particular also the current value of the at least one variable. The screen images are generated using the image frame data in accordance with a set of rules. The image frame data constitute templates that the graphical user interface (GUI) uses to uniformly depict menus and submenus of the operating software of the control electronics. By using this image frame data, the functional module is accessed in a visualization environment that is uniform with the rest of the graphical user interface for setting the centrifugal pumps. The control electronics only provides predefined image frame data (screen types) for the various variable types, for their display and modification.

The set of rules represents an algorithm that reads and interprets the attribute values by filling the image frame data with content, the content itself and its representation within the image frame data being determined by the attribute values. The screen images generated are independent of the operating software of the control electronics, in the sense that they were neither completely nor partially part of the operating software or the graphical user interface before the functional module was connected. As a result of generating the screen images, these, including the submenus that they visualize, become part of the operating software and the graphical user interface. This can be permanent, but preferably is only temporary—suitably as long as the functional module is connected to the control electronics.

According to the invention, the screen images or the corresponding submenu that visualizes the screen image are shown on the display. This takes place selectively, that is, depending on the selection of the corresponding submenu by a user. The value of the variable is integrated into one of the screen images and displayed accordingly.

If the variable is a configurable operating parameter, the control electronics can expect, in particular while the value of the variable is being displayed in the corresponding screen image, a user input in which the variable is assigned a value and is at least temporarily stored or cached in the control electronics. The value can then be transmitted to the functional module and stored there so that the functional module is configured with regard to this operating parameter.

It can preferably be provided that an identifier of the at least one functional unit is integrated into a screen image that is part of the operating software in order to be able to select the functional unit of the functional module. The screen image thus already exists at the time the functional module is connected to the control electronics. However, it is supplemented by an identifier of the functional unit. In the case of several functional units present in the functional module, the screen image is supplemented by an identifier for each of the functional units so that the screen image contains an overview of all available functional units. The functional unit can then be selected in this screen image or, in the case of several functional units, the corresponding functional unit can be selected. For this purpose, the control electronics then waits for a corresponding user input in the form of an activation or selection of one of the functional units via the corresponding identifier.

It is particularly user-friendly if the identifier is a name of the functional unit. This can then be displayed in plain text on the screen, so that a user recognizes in a self-explanatory manner that functional unit or functionality of the connected functional module he is accessing by selecting this identifier during the aforementioned user input.

According to one embodiment, a separate screen image is generated for each functional unit. This screen image or screen images is/are preferably subordinate to the screen image containing the identifier (s) of the functional unit (s), so that a hierarchical menu structure results, which suitably continues the menu structure of the operating software of the control electronics. The screen image that contains the identifier (s) of the functional unit (s) thus forms a superordinate screen image and is referred to as such below. In other words, a screen image assigned to a functional unit visualizes a submenu to the menu that is visualized in the superordinate screen image, and is used to activate or select the corresponding functional unit. The screen representation assigned to a specific functional unit is preferably shown on the display when the corresponding functional unit or its identifier is selected in the superordinate screen view. Depending on the size of the display, however, it is also possible for the superordinate screen image and the screen image (s) for the functional unit (s) to be shown on the display at the same time.

It also contributes to user-friendliness if a/the identifier of that functional unit is (also) integrated into the given screen image to which this screen image is assigned.

Preferably, an identifier of the at least one variable, in particular at least all read-authorized variables of the functional unit, is integrated into the given screen image assigned to a functional unit. The controller then waits for an activation or selection of one of the variables via the corresponding identifier.

The functional module preferably transmits the number of functional units present in the functional module to the control electronics. This informs the control electronics how many functional unit identifiers must be integrated into the superordinate screen image and/or how many functional unit-related screen images or submenus must be generated. The control electronics can thus generate a number of screen images corresponding to this number.

According to one embodiment, a subordinate screen image is generated for each variable. This can be subordinate to the screen image of the given functional unit to which the variable is assigned. The hierarchical menu structure is thus continued. A screen image assigned to a functional unit thus forms a superordinate screen image. In other words, a screen image assigned to a variable visualizes a submenu for the menu that is visualized in the functional unit-related screen image, and is used to activate or select the corresponding variable. The screen view assigned to a specific variable is preferably shown on the display when the corresponding variable or its identifier is selected in the functional unit-related screen view. Depending on the size of the display, however, it is also possible for the functional unit-related screen image and the screen image(s) for the variable(s) to be shown on the display at the same time.

An identifier of the variable to which this screen image is assigned is preferably integrated into the given subordinate screen image. The user is thus informed that he is actually in the menu previously selected by him in order to gain access to the variable.

It is particularly user-friendly if the identifier is a name of the variable. This can then be displayed in plain text on the screen, so that a user recognizes in a self-explanatory manner which variable he is accessing by selecting this identifier for the aforementioned user input. The user therefore does not necessarily need installation and operating instructions for the functional module for a configuration.

It makes sense to display the current value of the variable in the subordinate screen image. If it is a configurable or write-authorized variable, the control electronics can expect a user input in order to change the variable or to specify a value for it.

The functional module preferably transmits the number of variables of the given functional unit to the control electronics. This informs the control electronics how many variable identifiers have to be integrated into the functional unit-related screen image and/or how many subordinate screen images or submenus have to be generated. The control electronics can thus generate a number of subordinate screen images corresponding to the number of variables.

In one embodiment, the functional module comprises main attributes that describe the properties of the given functional unit. The functional module can send values of these main attributes to the control electronics, which then uses these values when generating the screen images. For example, one of the main attributes can contain the identifier of the functional unit or one of the functional units. Furthermore, one of the main attributes can contain the number of variables of the given functional unit.

In another embodiment, the attributes of the at least one variable include basic attributes and at least one variable-specific attribute that is/are dependent on one of the basic attributes. For example, the number of variable-specific attributes and/or the object they describe can be dependent on the basic attributes. In contrast, the number of basic attributes and/or their content can be identical for each variable and each functional module. The variable-specific attributes preferably define the manner in which the variables are reproduced in the corresponding screen image and/or the manner in which the variable value is specified during the user input, as will be made clear below.

The totality of the main attributes, basic attributes and variable-specific attributes forms a constitutional design that is stored in the functional module.

The basic attributes can include, for example, one of the following attributes:

- an attribute that specifies a plain text name of the variable,
- an attribute that specifies read and/or write privileges for the variable,
- an attribute that indicates whether the variable consists of a single value or a field with single values, an attribute that defines the variable type, in particular whether it is a numerical value (number), a list element of a selection list, or a character string,
- an attribute that indicates the data type of the variable used for storage purposes, in particular whether it is a whole number (integer) or a floating point number and/or how many bits represent the operating parameter value, and/or
- an attribute that indicates the current value of the variable.

By specifying the variable type in one of the basic attributes, the type of specification of the value of the variable in the user input is determined, provided that the variable is a configurable variable. The control electronics can therefore preferably activate a specific editor of a plurality of editors for a user input as a function of the specified variable type, while the corresponding subordinate screen image is displayed.

If one of the basic attributes indicates that the variable type is a numerical value, in particular that the value of the variable has to be specified by entering a number, the variable-specific attributes can include at least one of the following attributes:

- an attribute that specifies the physical unit of the variable to be displayed in the subordinate screen image, or the absence of such a unit,
- an attribute indicating the physical unit of the variable to be used for calculations, or the absence of such a unit,
- an attribute that specifies a maximum setting value of the variable for user input,
- an attribute that specifies a minimum setting value of the variable for user input,
- an attribute that specifies the step size of a change in the variable for the user input,
- an attribute that specifies a number format of the value of the variable to be displayed in the generated screen image,
- an attribute that specifies the number of decimal places to be displayed in the generated screen image,
- an attribute that specifies the number of places in front of the decimal point to be displayed in the generated screen image.

These variable-specific attributes define, on the one hand, the form of the display of the variable value in the screen image (number format, places before and after the decimal point, physical unit) and, on the other hand, determine the type of value specification (increment, minimum/maximum value).

According to the invention, it is provided that the control electronics generates the screen images and/or carry out a further action as a function of the values of the attributes.

According to one embodiment, the display of the value of the variable in the corresponding screen image can be padded with leading zeros if the value of the variable has a number of places in front of the decimal point that is less than a number of places in front of the decimal point to be displayed that is defined in an attribute, in particular a variable-specific attribute of the variable. Additionally or alternatively, the display of the value of the variable in the screen image can be limited to a number of decimal places to be displayed that is defined in an attribute, in particular a variable-specific attribute of the variable.

According to one embodiment, the value range that can be entered upon user input can be limited to a minimum and/or maximum setting value of the variable that is/are each defined in an attribute, in particular a variable-specific attribute of the variable.

According to one embodiment, the input of the value of the variable in the user input can be set to a step size that is defined in an attribute, in particular a variable-specific attribute of the variable.

According to one embodiment, the value of the variable can be reproduced in the screen image with a physical unit that is defined in an attribute, in particular a variable-specific attribute of the variable.

According to one embodiment, the control electronics can activate a numeric editor for the user input if one of the attributes, in particular a basic attribute, indicates that the data type of the variable is numeric.

According to one embodiment, the control electronics for the user input can integrate a list of options defined by the attributes, in particular the variable-specific attributes, into the screen image if one of the attributes, in particular a basic attribute, indicates that the data type of the variable is a selection list.

According to one embodiment, the control electronics can activate an alphanumeric editor for user input, in particular integrate it into the screen image showing the variable value, if one of the attributes, in particular a basic attribute, indicates that the data type of the variable is a character string.

According to one embodiment, the control electronics can limit an input by the alphanumeric editor to a maximum character length that is defined in an attribute of the variable, in particular in a variable-specific attribute.

After the value has been stored or temporarily stored, the control electronics can send a change message to the functional module, after which the functional module retrieves the changed value of the variable from the control electronics and saves it. In this case, the control electronics only makes the changed variable value available for retrieval. This has the advantage that the pump electronics only require server functionality, but no client functionality. Furthermore, the communication volume (overhead) at the interface is minimized by using the change notification. Alternatively, the changed value can be transmitted directly from the control electronics to the functional module.

It is advantageous if the entered value is checked in the functional module. The control electronics therefore does not need to know any conditions that are checked during the checking procedure. Such a check can include, for example, whether a correct network address such as an IPv4 address was specified for a variable whose value contains a network address, or, for a variable whose value contains a password, whether this password meets certain minimum requirements such as character length, diversity of characters, etc.

The functional module preferably sends an error message to the control electronics if the check shows that the entered value is inadmissible. It is also useful if the error message contains a reason for the error. This supports the user in correcting the input and thus increases user-friendliness. In addition, it can be provided that the control electronics generates a screen image showing an error using the image frame data. This can preferably contain the reason for the error. For the generation of the screen image, such a template can be selected from the image frame data specifically provided for the visualization of errors.

Furthermore, the invention generally relates on the one hand to an electronic functional module for executing the aforementioned method, insofar as the method relates to the functional module and, on the other hand, to control electronics for executing the aforementioned method, insofar as the method relates to the control electronics.

In particular, the invention relates to an electronic functional module that can be connected to control electronics of a centrifugal pump assembly in order to supplement the control electronics with at least one additional function, comprising

- a controller, in particular a processor,
- a functional unit providing the additional function,
- a nonvolatile memory in which operating software and the value of at least one variable of the functional unit are stored, and
- an electrical communication interface for, in particular, a plug-in connection of the functional module with the control electronics, amd the controller is connected to the functional unit, the memory and the communication interface. Values of attributes that describe properties of at least one variable of the functional unit are stored in the memory.

According to the invention, the functional module is configured to carry out the method in accordance with at least one of the aspects described above, insofar as the method relates to the functional module. The functional module is at least configured to send the attribute values to the control electronics via the communication interface.

In particular, the invention also relates to control electronics of a centrifugal pump assembly, in particular including a centrifugal pump assembly having such control electronics to which an electronic functional module can be connected in order to supplement the control electronics with at least one additional function, comprising

- a controller, in particular a processor,
- a nonvolatile memory in which are stored operating software with a menu-based graphical user interface for making settings on the centrifugal pump assembly, and image frame data that define the appearance of the graphical user interface, and an electrical communication interface, in particular for receiving the plug-in functional module, and
- the controller is connected to the memory and the communication interface and is in operative connection with a display, and possibly an input device. A set of rules for generating screen images from the image frame data is stored in the memory. According to the invention, the control electronics is configured to carry out the method in accordance with at least one of the aspects described above, insofar as the method relates to the control electronics.

The control electronics is configured to, at least, receive values of attributes that describe the properties of at least one variable of the functional unit via the communication interface, as a function of the attribute values, using the image frame data and according to a set of rules stored in the memory, generate screen images that are independent of the operating software and that supplement the user interface at least temporarily with submenus, and selectively display the screen images, including a value of the variable integrated into one of the screen images.

The control electronics is preferably also configured to wait for a user input in which a value is assigned and saved to the variable with the aid of the corresponding screen image, and then transmit the value to the functional module via the communication interface.

The display can structurally be part of the control electronics. However, it is also possible that the display is part of an external device, such as a computer, a smartphone or a tablet. In this case, the control electronics is in communication with this external device, and transmits the screen images, or at least parts thereof, or data for the external device to generate corresponding screen images that are then shown on the display.

According to one embodiment, the graphic user interface or the screen images are displayed within a browser that is operated on the control electronics or the external device. Accordingly, the screen images can be created in a markup language such as HTML.

Finally, the invention also relates to a set comprising control electronics for a centrifugal pump assembly of the aforementioned type, and a first and a second functional module of the aforementioned type, which differ in the additional function that supplements the control electronics and that can selectively be connected to the control electronics, in particular to the same communication interface of the control electronics or to the same slot.

It should be noted that in the context of the present description, the terms "have," "comprise" or "contain" in no way exclude the presence of further features. Furthermore, the use of the indefinite article for an object does not preclude its plural.

BRIEF DESCRIPTION OF THE DRAWING

The above and other objects, features, and advantages will become more readily apparent from the following description, reference being made to the accompanying drawing in which:

FIGS. 2A and 2B are a constitutional design of the functional module by means of attributes, FIG. 3 is a chart of a set of rules for generating screen images.

SPECIFIC DESCRIPTION OF THE INVENTION

Figure 1:
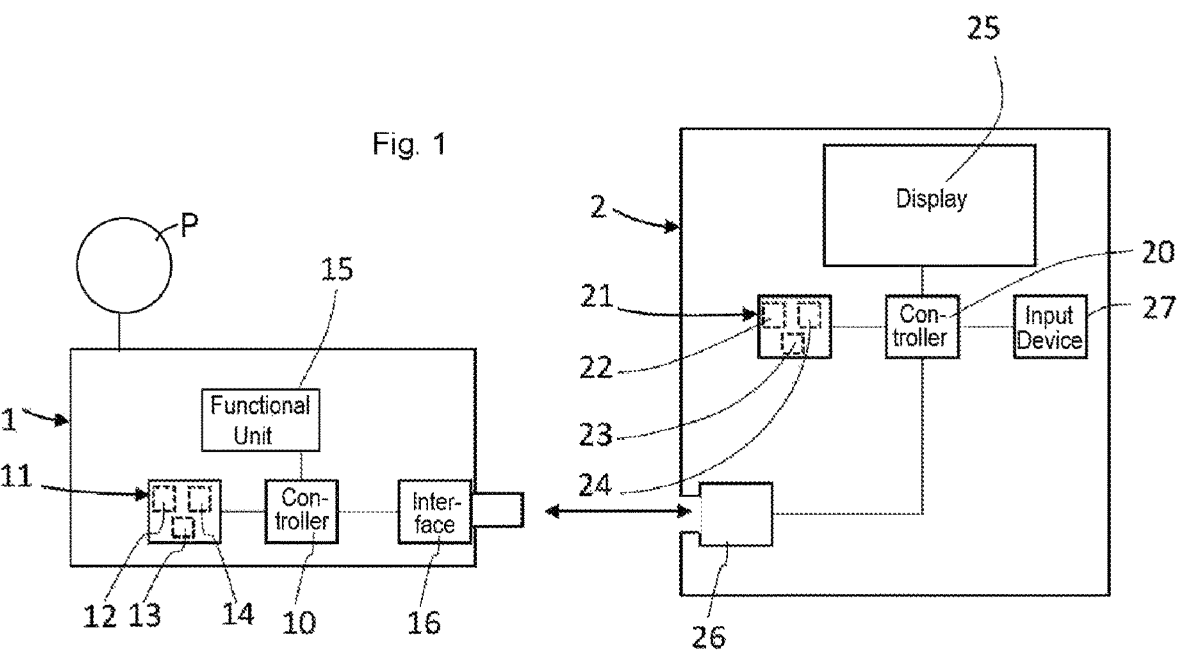
FIG. 1 is a schematic view of control electronics, and of a functional module that can be connected to it.

FIG. 1 illustrates the basic structure of a functional module 1 according to the invention, and control electronics 2 of a electromotive centrifugal pump assembly P. The control electronics 2 has a controller 20 in the form of a processor, a nonvolatile memory 21, at least one input device 27, a display 25, and an electrical communication interface 26 via which the functional module 1 can be plugged into the control electronics 2. Although the input device 27 is shown functionally separate from the display 25, in one embodiment it can be part of it, for example a touch-sensitive surface of the display 25. The control electronics 2 suitably also includes an unillustrated frequency converter for controlling and supplying an electric motor of the centrifugal pump P. The memory 21, display 25, input device 27 and communication interface 26 are connected to the controller 20 for data exchange.

Operating software 22 for the control electronics 2 and for the centrifugal pump P is stored in the memory 21. The operating software includes a graphical user interface (GUI) for making settings on the centrifugal pump assembly P, and for accessing information from the control electronics and pump data. It is formed by screen images that are shown on the display 25 and that include menus. The screen images are created from image frame data 23 that define the appearance of the graphical user interface and that are also stored in the memory 21. In addition, a set 24 of rules is stored in the memory 21 and creates screen data from the image frame data as a function of certain specifications, as will be clarified below.

The communication interface 26 has a connector via which the functional module 1 can be connected. For this purpose, the functional module 1 has its own communication interface 16 that is designed in this case in the form of a plug. The functional module 1 has no display. The control electronics 2 has no information about the functional module 1 before connection.

The functional module 1 comprises a functional unit 15 that supplements the control electronics 2 with an additional function. In the example according to FIG. 1, the functional unit 15 is a Bluetooth interface. In other words, the functional module 1 is a communication module, in particular a Bluetooth module. It consequently supplements the control electronics 2 by a Bluetooth communication function in order to enable communication with other Bluetooth-enabled devices such as smart phones or tablets. As an alternative or in addition, the functional module 1 could also contain a different or additional functionality.

The functional module 1 also has a controller 10 in the form of a processor and a nonvolatile memory 11. In the memory 11 there is operating software 12 for the functional module 1 as well as a constitutional design 13 formed by attributes and their values 14. The attributes describe properties of the functional module, of the functional unit, and of at least one variable of the functional unit. The memory 11, the functional unit 15, and the communication interface 16 are connected to the controller 10 for the exchange of data.

Figure 2B:
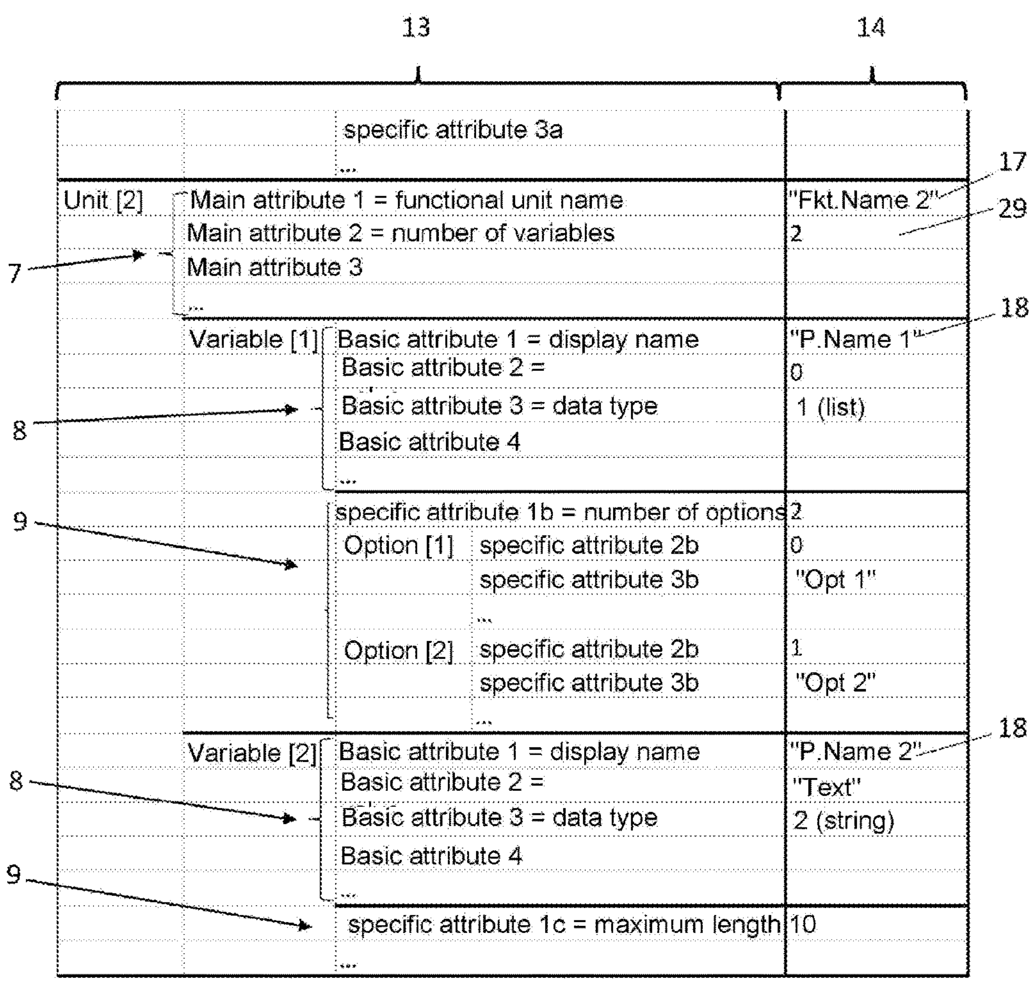

FIGS. 2A and 2B illustrate a constitutional design 13 of a functional module 1 according to a further embodiment in which the functional module 1 contains two functional units that are designated in FIGS. 2A and 2B as unit [1] and unit [2]. For example, c is a MODBUS interface and unit [2] is a Bacnet interface.

The constitutional design 13 includes an indication of the number 19 of the functional units contained in the functional module 1. This information can be referred to as a general attribute. The value 19 of this general attribute is 2 in this case. In the case of FIG. 1, the value is 1.

The constitutional design 13 further includes information regarding the functional unit or units present, in this case the first functional unit "unit [1]" and the second functional unit "unit [2]." This information relates on the one hand to general information about the given functional unit, and information relating to one or more variables that the given functional unit uses. The general information is contained in main attributes 7. These exist identically for all functional units, but with different values.

In the example according to FIGS. 2A and 2B, a first main attribute 1 specifies an identifier 17 in the form of a name of the functional unit. The first functional unit [1] has the identifier "Fkt.Name 1" and the second functional unit [2] has the identifier "Fkt.Name 2." Another main attribute 2 specifies the number 29 of variables that the corresponding functional unit has. The number of variables 29 for the first functional unit is "1," and for the second functional unit is "2."

The information relating to the variables is logically divided, on the one hand, into general information that is contained in basic attributes 8, and, on the other hand, into individual information that is contained in variable-specific attributes 9. The basic attributes 8 exist identically for all variables, but with different values.

In the example according to FIGS. 2A and 2B, a first basic attribute 1 specifies an identifier 18 in the form of a name of the variable. The variable [1] of the first functional unit [1] and the first variable [1] of the second functional unit each have the identifier "P.Name 1," and the second variable [2] of the second functional unit [2] has the identifier "P.Name 2." Another basic attribute 2 indicates the value of the respective variables.

A third basic attribute 3 is also provided in the example that specifies the data type of the variable. This data type can be, for example, a numerical value or a number, an enumeration, or a character string. In the present case, the value 0 of basic attribute 3 stands for the variable type "number," the value 1 stands for the variable type "enumeration," and the value 2 stands for the variable type "string." This coding can of course also be completely different. It is only used here to facilitate understanding. The variable type also indicates how the value of the variable is to be specified by the user input.

The basic attributes 8 can also include the following information:

- an attribute that specifies read and/or write privileges for the variable,
- an attribute that indicates whether the variable consists of a single value or a field with single values,
- an attribute that indicates the data type of the variable used for storage purposes, in particular whether it is a whole number (integer) or a floating point number and/or how many bits represent the operating parameter value, and/or
- an attribute that specifies an identifier for the unambiguous identification of a variable in order to address it and to be able to read and write its value.

The variable-specific attributes 9 can vary in their number and their content. This depends on the variable type or on the basic attribute 8 which specifies the type of the variable.

In the case of the variable [1] of the first functional unit [1] of the "number" type, the specific attributes 1*a*, 2*a*, 3*a*, etc. include, for example, the following:

- an attribute that indicates a physical unit of the variable to be displayed, or the absence of such a unit,
- an attribute that specifies a physical unit of the variable, or the absence of such a unit that is used when reading, writing or saving the variable value,
- an attribute that specifies a maximum setting value of the variable for user input,
- an attribute that specifies a minimum setting value of the variable for user input,
- an attribute that specifies the step size of a change in the variable for the user input,
- an attribute that specifies a number format of the value of the variable to be displayed in the generated screen image,
- an attribute that specifies the number of decimal places to be displayed in the generated screen image,
- an attribute that specifies the number of places left the decimal point to be displayed in the generated screen image.

In the case of the first variable [1] of the second functional unit [2] of the "enumeration" type, the specific attributes 1*b*, 2*b*, 3*b*, etc. define a list of options 1 to z. A first specific attribute 1*b* indicates the number z of options, a second specific attribute 2*b* indicates a number of the corresponding option, and a third specific attribute 3*b* indicates a name of the corresponding option. In the example according to FIG. 2*b*, there are two options [1] and [2], which have the option numbers 0 and 1 and the names "Opt 1" and "Opt 2." Option [1] is selected because the current value of the first variable [1], or its basic attribute 2, is equal to the option number of the first option [1], that is, corresponds to the value of the second specific attribute 2*b* of option [1]. This coding can of course also be completely different. It is only used here to provide understanding.

In the case of the second variable [2] of the second functional unit [2] of the "character string" type, there is only one specific attribute 1*c*. This indicates the maximum length of the character string.

As the above explanation makes clear, the variable-specific attributes 9 on the one hand define how the variable value is to be reproduced on the display 25, for example with regard to the number format, number of places before and after the decimal point, or the physical unit. On the other hand, they determine the manner of the value specification, such as the increment, a minimum or maximum value, selection list, text specification. In its entirety, the constitutional design 13 together with the associated attribute values 14 thus represents a comprehensive technical description of the functional module 1 in order to enable access to the variable or variables in the functional module 1. This is illustrated in FIGS. 3, 4, 5A and 5B.

Figure 5A:
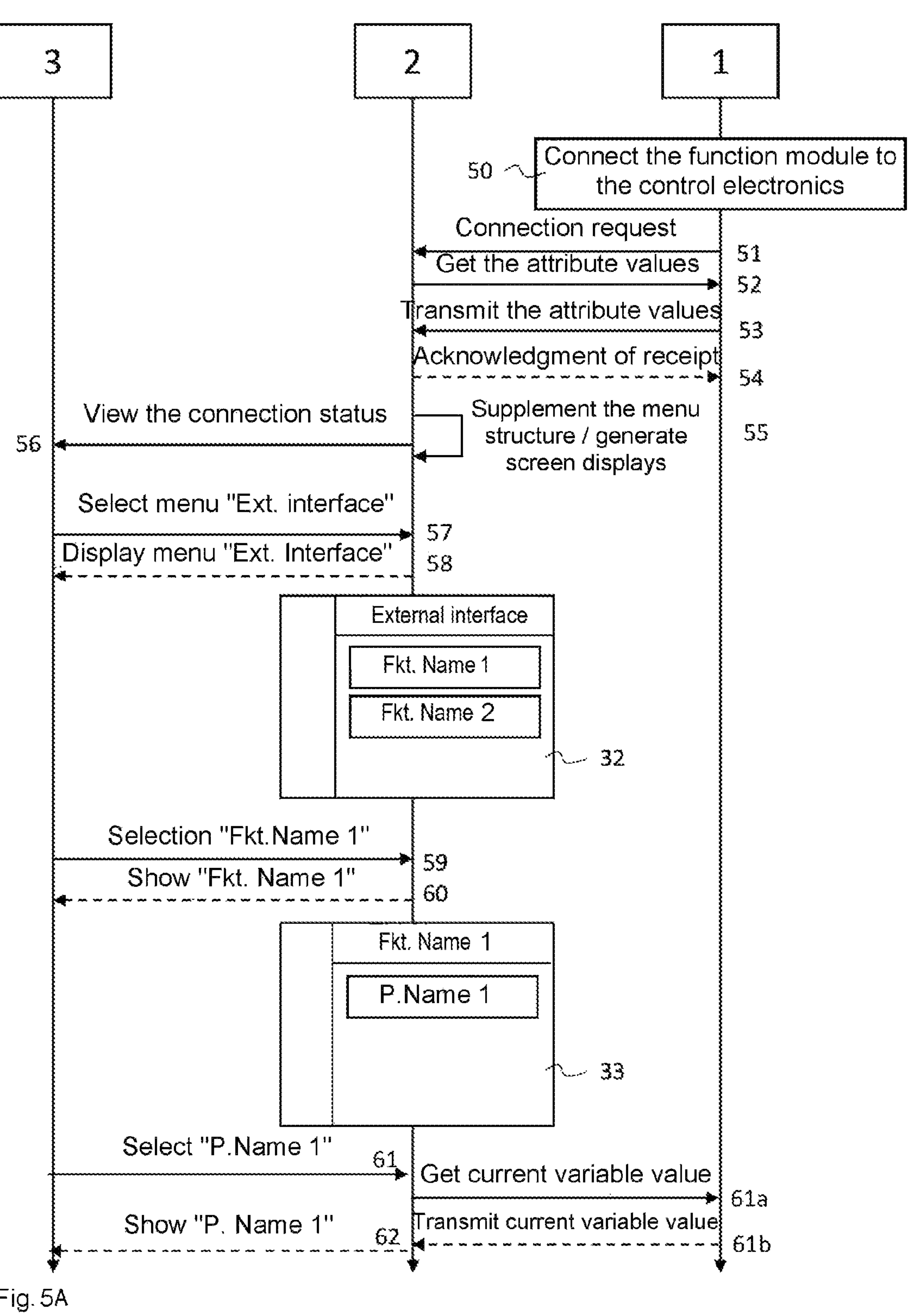
FIGS. 5A and 5B are a flow chart of the method.
Figure 5B:
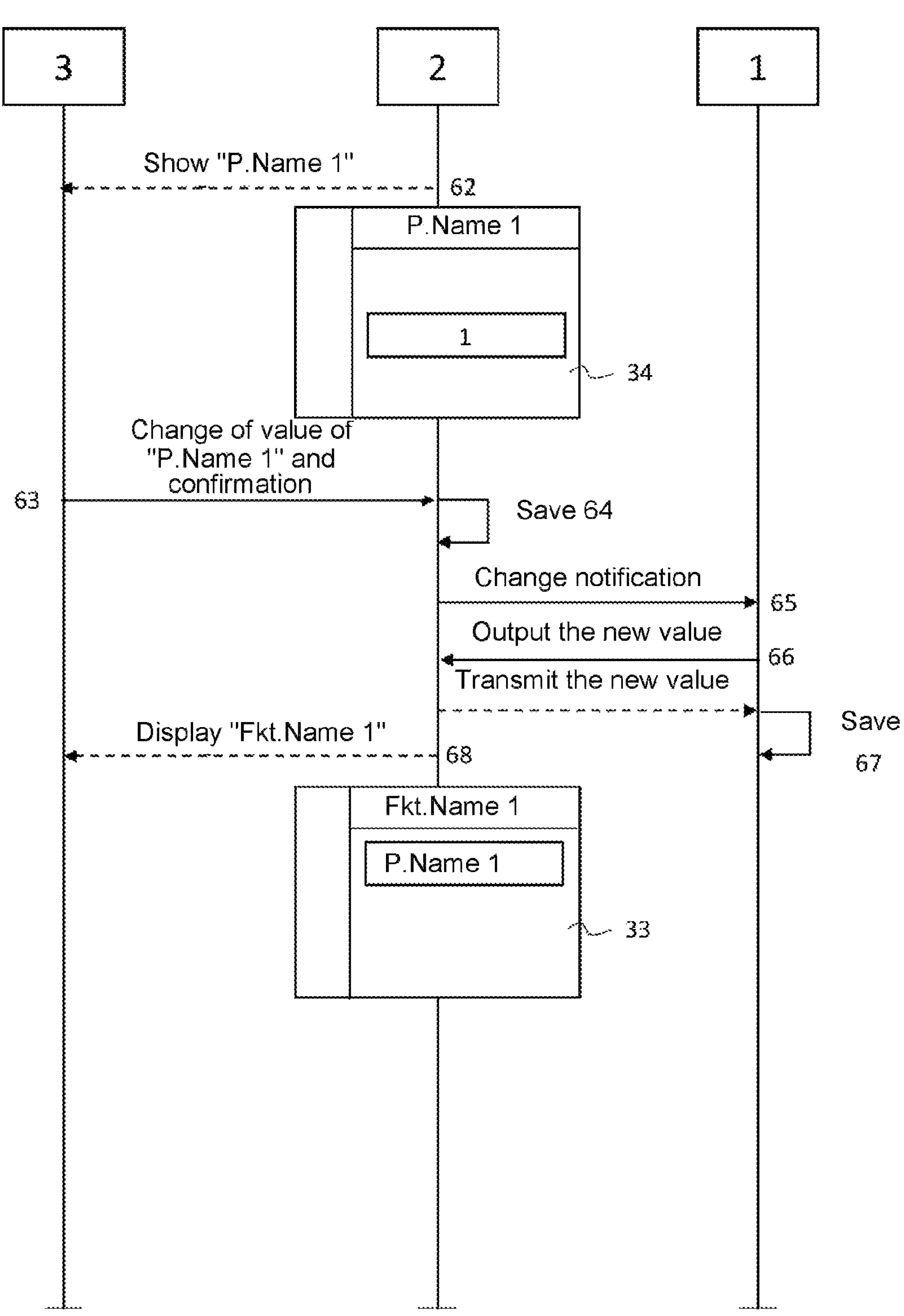

FIGS. 5A and 5B show a flowchart or interaction diagram for an example of the method according to the invention. At the beginning of the method, a functional module 1 is connected to the control electronics 2 by a user 3; step 50. In the present example, the functional module 1 that is used is the one whose constitutional design 13 is shown in FIGS. 2A and 2B. The broken-line arrows in the flowchart represent responses to requests.

After connection, the functional module 1 sends a connection request to the control electronics 2; step 51. The control electronics 2 then retrieves the attribute values 14, that is, the values of the general attribute, as well as the main attributes 7, basic attributes 8 and the variable-specific attributes 9 from the functional module 1; step 52, which transmits them accordingly; step 53. The control electronics 2 temporarily stores the values 14. It can also transmit an acknowledgment of receipt to the functional module 1; step 54. It should be noted that it is irrelevant for the method according to the invention and its functionality which side establishes the connection or which side initiates the connection. Thus, in an alternative variant to FIG. 5A, the connection request can originate from the control electronics 2 and/or be directed to the functional module 1.

Figure 4:
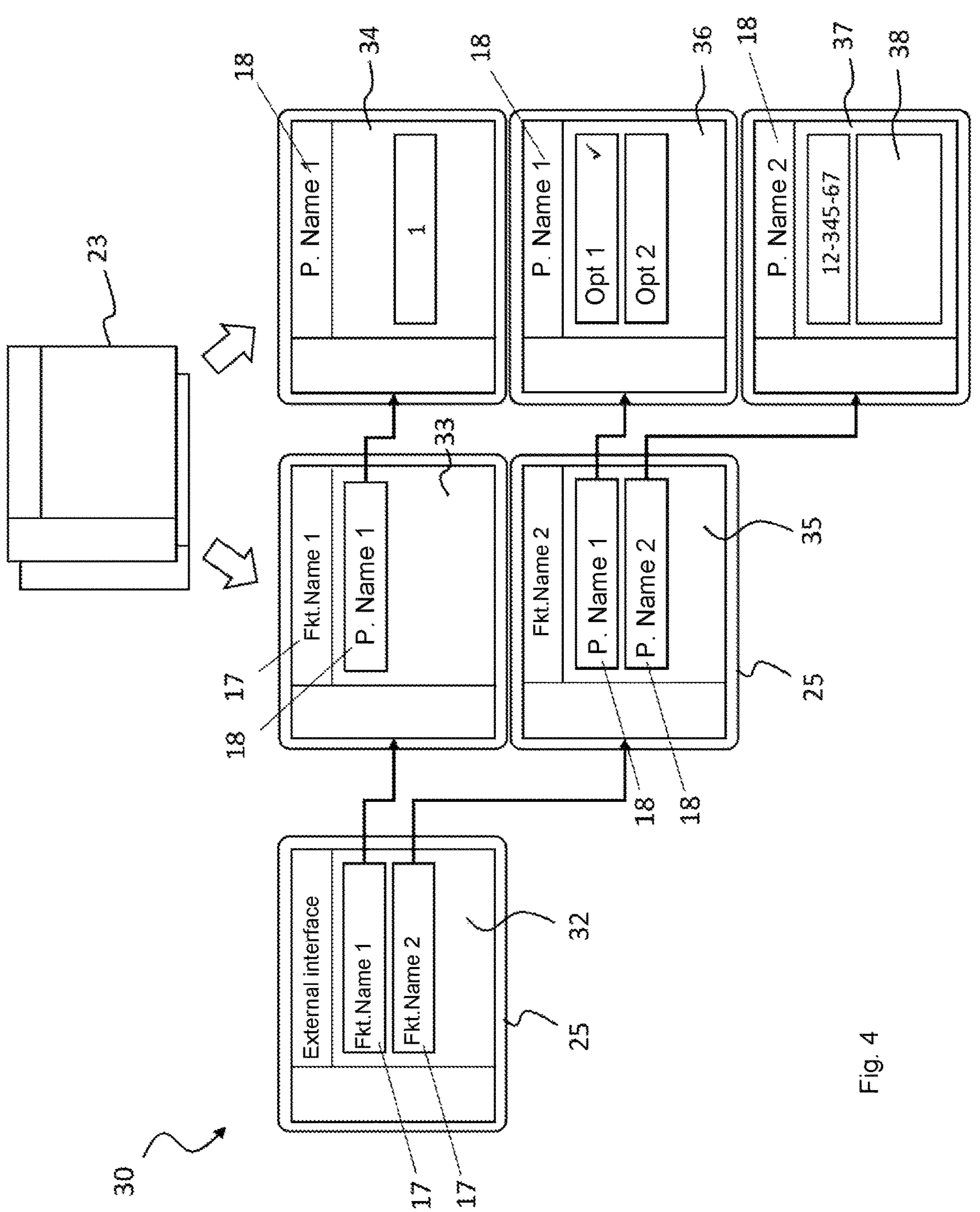
FIG. 4 is a view of the screen image generated in a hierarchical arrangement.

The control electronics 2 then expands the menu structure of its operating software 22 as a function of the attribute values 14 in order to enable access to the variables contained in the functional module 1; step 55. This is illustrated by FIG. 4.

On the one hand, a screen image 32 that is part of the operating software 22 and relates to the communication interface 26 is filled or supplemented by information from the constitutional design 13. For this purpose, the control electronics 2 uses the number 19 of the functional units present in the functional module 1 from the general attribute, and the identifier of the given functional unit, by integrating the corresponding identifier 17 for each of the two functional units [1] and [2] in the screen image 32 that becomes a superordinate screen image.

In addition, the control electronics 2 generates screen images 33, 34, 35, 36, 37 as a function of the attribute values 14 using the image frame data 23 according to the set 24 of rules that are independent of the operating software 22, that is, not previously available in the menu structure of the graphical user interface 30. The screen images supplement this menu structure at least temporarily, that is, as long as the functional module 1 is connected to the control electronics.

A separate screen image 33, 35 or, in other words, a separate menu, is generated for each functional unit [1], [2], via which access to the corresponding functional unit is configured. This functional unit-related screen image 33, 35 is hierarchically subordinated to the superordinate screen image 32. This occurs by selecting the identifier of the first functional unit [1] in the superordinate screen image 32 to call up the screen image 33 assigned to this first functional unit [1], and by selecting the identifier of the second functional unit [2] in the superordinate screen image 32 to call up the screen image 35 assigned to this second functional unit [2]. The identifier of the functional unit to which this screen image is assigned is also integrated into the given functional unit-related screen image 33, 35. In addition, an identifier of the variable (screen image 33) or of all variables (screen image 35) is integrated into the given functional unit-related screen image 33, 35.

In addition, a screen image 34, 36, 37 is also generated for each variable. The control electronics 2 knows the number of variables from the second main attributes of the two functional units. Thus, in the present example, three variable-related screen images 34, 36, 37 are generated. They are used to display the respective variable values, and also to edit them during the process of a user input, at least if the corresponding variable can be changed, which does not necessarily have to be the case, for example in the case of a measured value. The variable value is therefore integrated into the corresponding variable-related screen image 34, 36, 37. In addition, an identifier of the variable to which this screen image 34, 36, 37 is assigned is integrated into the given variable-related screen image. Each of the variable-related screen images 34, 36, 37 is subordinate to a functional unit-related screen image 33, 35, specifically the one that is assigned to the corresponding functional unit to which the given variable also belongs. The hierarchical menu structure is thus continued. A subordinate screen image 34, 36, 37 is called up by appropriately confirming or selecting the identifier of the variable in the functional unit-related screen image 33, 35.

In this way, the first subordinate screen image 34 that is assigned to the variable of the first functional unit can be called up and shown on the display 25 by selecting the identifier of the variable in the screen image 33 assigned to the first functional unit [1]. Furthermore, the second subordinate screen image 36 that is assigned to the first variable of the second functional unit can be called up and shown on the display 25 by selecting the identifier of the first variable [1] in the screen image 35 assigned to the second functional unit [2]. And finally, the third subordinate screen image 37 that is assigned to the second variable [2] of the second functional unit [2] can be called up and shown on the display 25 by selecting the identifier of the second variable [2] in the screen image 35 assigned to the second functional unit [2]. In other words, a screen image 34, 36, 37 assigned to a variable presents shown submenu for the menu that is visualized in the functional unit-related screen image 33, 35, and is used to activate or select the corresponding variables.

In the first subordinate screen image 34, a numerical editor is activated for the user input, and the control electronics 2 waits for a corresponding user input. The value of the variable of the first functional unit [1] is 1 in this case. This numerical value can be changed via the numerical editor, which can be operated via the input device 27, for example.

In the second subordinate screen image 36, the options of the enumeration are displayed. The value of the first variable [1] of the second functional unit [2] is for example 0 in this case, which means that option [1] is selected or valid. For example, option [1] can be “activated” and option [2] can be “deactivated.” In the second subordinate screen image 36, the control electronics 2 waits for a user input in the form of a selection of one of the options. This corresponds to a “selection editor.” Since only certain options are included in the list shown, incorrect user entries are reduced in advance.

In the third subordinate screen image 37, an alphanumeric editor 38 is activated for the user input, and the control electronics 2 waits for a corresponding user input. The alphanumeric editor 38 is integrated into the screen image 37 displaying the variable value, since an overview of alphanumeric characters and symbols is displayed in a region of the screen image 37. The value of the second variable [2] of the second functional unit [2] is “12-345-67.” This character string can be changed via the alphanumeric editor 38 by the individual characters being selected one after the other via the input device 27 from the overview of characters shown. The modified character string is checked by the functional module, which makes the result of the check and a specific error text available.

In order to generate the individual screen images 33, 34, 35, 36, 37, the set 24 of rules that is stored in the memory unit 21 of the control electronics 2 is executed. The rule set 24 describes how new screen images are generated from the attribute values using the image frame data, so-called screen types. The set 24 of rules inputs the attribute values 14 of the constitutional design 13 and interprets them. The set 24 of rules with the structure for inputting the attribute values 14 is shown in FIG. 3. This structure corresponds to the structure of the constitutional design 13 with regard to the attributes of the functional unit. To this extent, the control electronics 2 knows the structure of the constitutional design 13.

Among other things, the set 24 of rules successively generates the corresponding screen image 33, 35 for each functional unit, integrates therein the identifier of the given functional unit and the identifier(s) of the variable(s) of the given functional unit, generates a subordinate screen image 34, 36 for each variable, 37, integrates the identifier of the respective variables, also taking into account the variable type, its value or, in the case of an enumeration, its options, and activates a specific editor if necessary. When reproducing the variable value, the set 24 of rules takes into account the format information specified in the attributes, which relates to the representation, such as the number of places before and after the decimal point, the number format, the unit, etc. Furthermore, the set 24 of rules also configures the editor as a function of the attribute values 14, for example with regard to the step size of a change in value and/or a minimum and maximum setting value.

As FIG. 5A further shows, connection status can be displayed on the display 25 while the screen images 33, 34, 35, 36, 37 are being generated; step 56, in order to inform the user 3 that the functional module is connected to the control electronics and that the plugging in of the functional module was successful.

Either automatically or by manual selection by the user 3 in step 57, after the screen images 33, 34, 35, 36, 37 have been generated, the "External interface" menu can be displayed in the superordinate screen image 32; step 58, via which access to the variables of the functional units of the functional module 1 that is connected to the communication interface 26 is provided. In the superordinate screen image 32, the available functional units are indicated by an identifier Fkt.Name 1 and Fkt.Name 2. For example, Fkt.Name 1 stands for a MODBUS communication interface and Fkt.Name 2 for a BACnet communication interface, for each of which one or more operating parameters can be set.

The controller 2 then waits for a user input in the form of a selection of one of the functional units via the corresponding identifier. Purely by way of example, the first functional unit "Fkt.Name 1" is selected; step 59.

Subsequently, the generated screen view 33 assigned to the first functional unit is displayed on the display 27; step 60. This screen image 33 lists the variables—in particular, only the variables with read authorization. In the case of the first functional unit, however, there is only a single variable that is not only readable but also writable. Its identifier "P.Name 1" is displayed on screen 33. For example, this variable is the MODBUS RTU (Remote Terminal Unit) address.

The controller 2 then waits for a user input in the form of an activation and subsequent selection of a variable via the identifier "P.Name 1." This takes place in step 61. In the event that the attribute values input in steps 52, 53 only contain static information (for example in the form of a file), but the selected variable contains a dynamic value, the current variable value is read from module 1 after step 61; Steps 61*a*, 61*b*.

Subsequently, a subordinate screen image 34 assigned to the variables of the first functional unit [1] is generated and displayed on the display 27; step 62. This screen image 34 shows the possibly editable value of the variable, here the number 1. A numerical editor that is controlled via the input device 27 is activated. The editor takes into account further properties of the variables that are defined in the variable-specific attributes 9. In accordance with these properties, the user input is limited, for example, to a specific step size and/or a value range between a defined minimum value and a defined maximum value. In this way, incorrect user entries can be minimized in advance. The control electronics 2 waits for a corresponding user input with which the value of the variable of the first functional unit [1] is changed. This change in value takes place in step 63.

The control electronics 2 temporarily stores the changed value; step 64, and sends a message about the change in the variable value to the functional module 1; step 65. The functional module 1 then reads the new variable value from the memory 21 of the control electronics 2; step 66, and saves it; step 67. The control electronics 2 then exits the screen image 34 for the variable "P.Name 1" and returns to the screen image 33 assigned to the first functional unit. This screen image 33 can then also be exited, since the setting of the variables has been completed.

In contrast to the prior art, the configuration of operating parameters in the method according to the invention does not take place indirectly via setting parameters that are interpreted by the respective functional modules; rather, the operating parameters are set directly via corresponding variables. In other words, a value set on the display by the user 3 corresponds directly to the value of the operating parameter/variable to be configured, such that functional module 1 does not need to interpret the variable.

It should be pointed out that the above description is only given by way of example for the purpose of illustration and in no way restricts the scope of protection of the invention. Features of the invention that are specified as "may," "exemplary," "preferred," "optional," "ideal," "advantageous," "optionally" or "suitable" are to be regarded as purely optional, and also do not limit the scope of protection determined exclusively by the claims. Insofar as elements, components, process steps, values or information are mentioned in the above description that have known, obvious or foreseeable equivalents, these equivalents are also encompassed by the invention. The invention also includes any changes, alterations or modifications of embodiments that involve the exchange, addition, change or omission of elements, components, method steps, values or information, as long as the basic idea according to the invention is retained, regardless of whether the change, alteration or modifications lead to an improvement or a deterioration in an embodiment.

Although the above description of the invention names a large number of physical, immaterial or procedural features in relation to one or more specific embodiment(s), these features can also be used in isolation from the specific exemplary embodiment, at least insofar as they do not require the mandatory presence of further features. Conversely, these features mentioned in relation to one or more specific exemplary embodiment(s) can be combined with one another as desired and with further disclosed or undisclosed features of exemplary embodiments shown or not shown, at least as long as the features are not mutually exclusive or lead to technical incompatibilities.

The invention claimed is:

1. A method for expanding the functional scope of a centrifugal pump assembly by means of a functional module operating with control electronics of the centrifugal pump assembly to which it is connected, the method comprising the steps of:

establishing a physical connection between the functional module and the control electronics of the centrifugal pump assembly, wherein the control electronics of the centrifugal pump assembly comprises a first nonvolatile memory, a first processor, a first electrical communications interface with a connector via which the functional module is pluggable into the control electronics, and operating software stored in the nonvolatile memory, the operating software comprising a graphical user interface for settings of the centrifugal pump assembly, a set of menus, a set of submenus, and image frame data defining a set of templates used by the graphical user interface to uniformly depict the set of menus and the set of submenus, wherein the functional module comprises a second memory, a second processor, a second communications interface in the form of a plug, and at least one functional unit that adds an additional function to the control electronics of the centrifugal pump assembly and that has a set of variables, each variable formed by a respective set of attributes, each attribute describing a respective property of the corresponding variable and having a respective value;

wherein establishing the physical connection is performed by connecting the functional module via the plug to the connector of the first electrical communications interface of the control electronics of the centrifugal pump assembly, wherein the functional module is further adapted to be physically separate from the control electronics of the centrifugal pump assembly when disconnected from the control electronics of the centrifugal pump assembly;

in response to the physical connection between the functional module and the control electronics of the centrifugal pump assembly:

the functional module, at the request of the control electronics of the centrifugal pump assembly or unsolicited, transmitting a number representing a quantity of the variables in the set of variables and the values of the attributes to the control electronics of the centrifugal pump assembly, wherein neither the set of variables nor the associated attributes is known to the control electronics of the centrifugal pump assembly in advance of the establishing of the physical connection, and the control electronics of the centrifugal pump assembly expanding the graphical user interface by performing the following operations:

generating, as a function of the number of variables and the attribute values transmitted by the functional module, using the image frame data and according to a set of rules, a plurality of additional screen views that are independent of the operating software, wherein the plurality of additional screen views comprises a set of first additional screen views and a set of second additional screen views arranged in a hierarchical structure, wherein each first additional screen view provides access to at least one second additional screen view, wherein the plurality of additional screen views is neither completely nor partially part of the operating software or the graphical user interface prior to the establishing of the physical connection between the functional module and the control electronics, wherein the set of rules represents an algorithm that reads and interprets the values of the attributes by filling the image frame data with content determined based on the values of the attributes, supplementing the graphical user interface by means of the additional screen views at least temporarily, and showing at least one of the plurality of additional screen views, including a value corresponding to at least one variable of the set of variables integrated into one of the additional screen views, on a display.

2. The method according to claim 1, wherein the at least one variable is a configurable operating parameter and the control electronics waits for user input that assigns the at least one variable a selected value that is buffered in the control electronics, and transmitted to the functional module.

3. The method according to claim 1, further comprising the steps of: integrating one or more identifiers each of which corresponds to the at least one functional unit of the functional module into a superordinate screen view that is part of the operating software, and a controller waiting for an activation or selection of one of the functional units via the corresponding identifier.

4. The method according to claim 1, wherein the functional module comprises two or more functional units that each add respective additional function to the control electronics, and wherein each functional unit has respective attribute values of at least one associated variable of the respective functional unit that the functional module transmits to the control electronics.

5. The method according to claim 1, further comprising the step of generating a separate screen view for each functional unit.

6. The method according to claim 5, further comprising the steps of: integrating an identifier of at least every variable of the at least one functional unit with read authorization in the respective screen view assigned to a particular functional unit, and a controller waiting for a user input in a form of an activation or selection of one of the variables via a corresponding identifier.

7. The method according to claim 1, further comprising the steps of:

generating a subordinate screen view for the at least one variable or for each variable that is subordinate to the screen view of the at least one functional unit to which the at least one variable is assigned, and displaying a current value of the at least one variable in the subordinate screen view.

8. The method according to claim 1, wherein the functional module comprises main attributes that describe one or more identifiers corresponding to the at least one functional unit or the number of variables of the functional unit, and the functional module transmits values of one or more main attributes to the control electronics that uses these values when generating the screen views.

9. The method according to claim 1, wherein the attributes of the at least one variable comprise one or more basic attributes and at least one variable-specific attribute that is/are dependent on one of the basic attributes, wherein the at least one variable-specific attribute defines at least one of a first manner in which a corresponding variable is rendered in a corresponding screen image or a second manner in which the corresponding variable value is changed during the user input.

10. The method according to claim 1, further comprising the step of:

padding a display of a value of the at least one variable in the screen view with leading zeros if the value of the at least one variable has a number of places before the decimal point that is less than a number of digits before the decimal point to be displayed that is defined in an attribute of the variable.

11. The method according to claim 1, further comprising the step of:

limiting a display of a value of the at least one variable in the screen view to a number of decimal places to be displayed that is defined in an attribute of the variable.

12. The method according to claim 2, further comprising the step of:

limiting a value range that can be entered during the user input to a minimum and/or maximum setting value of the variable that is/are each defined in an attribute of the variable.

13. The method according to claim 2, further comprising the step of:

setting an input of a value of the at least one variable during a user input procedure to a step size that is defined in an attribute of the variable.

14. The method according to claim 1, further comprising the step of:

displaying a value of the at least one variable in the screen view with a physical unit that is defined in an attribute of the variable.

15. The method according to claim 2, further comprising the step of:

the control electronics activating a numeric editor for the user input if one of the attributes indicates that a data type of the at least one variable is numeric.

16. The method according at least to claim 2, further comprising the step of:

the control electronics integrating a list of options defined by the attributes into the screen view for the user input if one of the attributes indicates that a data type of the at least one variable is a selection list.

17. The method according at least to claim 2, further comprising the step of:

the control electronics activating an alphanumeric editor for the user input integrated into the screen view if one of the attributes indicates that a data type of the at least one variable is a character string.

18. The method according at least to claim 2, further comprising the step of:

the control electronics limiting an input by the alphanumeric editor to a maximum character length that is defined in an attribute of the at least one variable.

19. The method according at least to claim 2, further comprising the steps, in the case of a character string as the user input, of:

checking a value entered in the functional module, the functional module transmitting an error message indicating an error to the control electronics if the check shows that the value entered is inadmissible, and the control electronics, using the image frame data, generating a screen view indicating an error containing a reason for the error.

20. A functional module configured to carry out the method according to claim 1.

21. A control electronics of a centrifugal pump assembly configured to carry out the method according to claim 1.

22. A set comprising a control electronics according to claim 21, and a first functional module and a second functional module both according to claim 20, wherein the first and second functional modules differ in the function that they add to the control electronics, and can be selectively connected to the control electronics to the same communication interface of the control electronics.

23. The method according to claim 9, wherein the one or more basic attributes specify at least one of:

a plain text name of the at least one variable;

read and/or write privileges for the at least one variable;

whether the at least one variable includes a single value or a field with single values;

a type of the at least one variable as one of a numerical value, a list elements of a selection list, or a character string;

a first data type of the at least one variable used for storage purposes as one of an integer, a floating point number, or a value indicating how many bits represent an operating parameter value; or a current value of the variable.

24. The method according to claim 9, wherein the one or more basic attributes indicate that the type of at least one variable type is a numerical value;

wherein the at least one variable-specific attributes specifies at least one of:

a status of a physical unit of the at least one variable to be displayed in the subordinate screen image;

a status of a physical unit of the at least one variable to be used for calculations;

a maximum setting value of the at least one variable for user input;

a minimum setting value of the at least one variable for user input;

a step size of a change in the at least one variable for user input;

a number format of the value of the at least one variable to be displayed in the generated screen image;

a number of decimal places to be displayed in the generated screen image; or a number of places in front of a decimal point to be displayed in the generated screen image.

25. A system comprising:

a control electronics of a centrifugal pump assembly, the control electronics comprising a first nonvolatile memory, a first processor, first electrical communications interface with a connector via which a functional module is pluggable into the control electronics, and operating software stored in the nonvolatile memory, the operating software comprising a graphical user interface for settings of the centrifugal pump assembly, a set of menus, a set of submenus, and image frame data defining a set of templates used by the graphical user interface to uniformly depict the set of menus and the set of submenus; and the functional module comprising a second memory, a second processor, a second communications interface in the form of a plug, and at least one functional unit that adds an additional function to the control electronics of the centrifugal pump assembly and that has a set of variables, each variable formed by a respective set of attributes, each attribute describing a respective property of the corresponding variable and having a respective value, wherein the functional module is adapted to be connected via the plug to the connector of the first electrical communications interface of the control electronics of the centrifugal pump assembly, wherein the functional module is further adapted to be physically separate from the control electronics of the centrifugal pump assembly when disconnected from the control electronics of the centrifugal pump assembly;

wherein the functional module is further adapted to:

in response to a physical connection between the functional module and the control electronics of the centrifugal pump assembly, at the request of the control electronics of the centrifugal pump assembly or unsolicited, transmit a number representing a quantity of the variables in the set of variables and the values of attributes to the control electronics of the centrifugal pump assembly, wherein neither the set of variables nor the associated attributes is known to the control electronics of the centrifugal pump assembly in advance of the establishing of the physical connection;

wherein the control electronics of the centrifugal pump assembly is adapted to:

in response to the physical connection between the functional module and the control electronics of the centrifugal pump assembly, expand the graphical user interface by performing the following operations:

generating, as a function of the number of variables and the attribute values transmitted by the functional module, using the image frame data and according to a set of rules, a plurality of additional screen views that are independent of the operating software, wherein the plurality of additional screen views comprises a set of first additional screen views and a set of second additional screen views arranged in a hierarchical structure, wherein each first additional screen view provides access to at least one second additional screen view, wherein the plurality of additional screen views is neither completely nor partially part of the operating software or the graphical user interface prior to the establishing of the physical connection between the functional module and the control electronics, wherein the set of rules represents an algorithm that reads and interprets the values of the attributes by filling the image frame data with content determined based on the values of the attributes, supplementing the graphical user interface by means of the additional screen views at least temporarily; and showing the screen views, including a value corresponding to at least one variable of the set of variables integrated into one of the screen views, on a display.

* * * * *